United States Patent
Stenneth

(10) Patent No.: US 10,352,720 B2
(45) Date of Patent: Jul. 16, 2019

(54) METHOD AND APPARATUS FOR ASSIGNING VEHICLES TO TRIPS

(71) Applicant: HERE Global B.V., Eindhoven (NL)

(72) Inventor: Leon Stenneth, Chicago, IL (US)

(73) Assignee: HERE Global B.V., Eindhoven (NL)

(*) Notice: Subject to any disclaimer, the term of this patent is extended or adjusted under 35 U.S.C. 154(b) by 45 days.

(21) Appl. No.: 14/012,329

(22) Filed: Aug. 28, 2013

(65) Prior Publication Data

US 2015/0066361 A1 Mar. 5, 2015

(51) Int. Cl.
- G06Q 10/04 (2012.01)
- G06Q 50/30 (2012.01)
- G08G 1/123 (2006.01)
- G08G 1/127 (2006.01)
- G01C 21/36 (2006.01)

(52) U.S. Cl.
CPC ....... G01C 21/3691 (2013.01); G06Q 10/047 (2013.01); G06Q 50/30 (2013.01); G08G 1/123 (2013.01); G08G 1/127 (2013.01)

(58) Field of Classification Search
None
See application file for complete search history.

(56) References Cited

U.S. PATENT DOCUMENTS

| | | | |
|---|---|---|---|
| 4,713,661 A | * | 12/1987 | Boone et al. .......... 340/994 |
| 5,168,451 A | * | 12/1992 | Bolger .......... 701/117 |
| 6,191,708 B1 | | 2/2001 | Davidson |
| 6,212,393 B1 | * | 4/2001 | Suarez et al. .......... 455/456.4 |
| 6,240,362 B1 | * | 5/2001 | Gaspard, II .......... 701/410 |
| 6,339,745 B1 | * | 1/2002 | Novik .......... 701/431 |
| 6,411,897 B1 | * | 6/2002 | Gaspard, II .......... 701/411 |
| 6,618,668 B1 | | 9/2003 | Laird et al. |

(Continued)

FOREIGN PATENT DOCUMENTS

| | | |
|---|---|---|
| EP | 1 348 184 A1 | 10/2003 |
| EP | 2 426 027 A2 | 3/2012 |

(Continued)

OTHER PUBLICATIONS

Nokia Public transport v2.5 for Symbian | Nokia Beta Labs [online] [retrieved Jul. 21, 2014]. Retrieved from the Internet: <URL: http://betalabs.nokia.com/trials/nokia-public-transport-v2-5-for-symbian>. (dated 2014). 2 pages.

(Continued)

*Primary Examiner* — Navid Ziaeianmehdizadeh
(74) *Attorney, Agent, or Firm* — Alston & Bird LLP

(57) ABSTRACT

A method, apparatus and computer program products are provided for matching a transit vehicle to a trip. An example method may comprise receiving probe data, the probe data comprising at least one of identity information, location information, or time information corresponding to the transit vehicle, causing placement of the probe data into a queue, wherein a placement in the queue is dependent on how much of the trip the transit vehicle has completed as indicated by the probe data, and causing assignment of the transit vehicle to a single candidate trip from among a set of candidate trips comprising a scheduled arrival time at a next closest stop closest to a calculated arrival time.

15 Claims, 4 Drawing Sheets

(56) References Cited

U.S. PATENT DOCUMENTS

| | | | | |
|---|---|---|---|---|
| 6,675,150 | B1* | 1/2004 | Camer | 705/7.21 |
| 6,975,997 | B1* | 12/2005 | Murakami et al. | 705/5 |
| 7,840,427 | B2* | 11/2010 | O'Sullivan | 705/6 |
| 8,140,256 | B1* | 3/2012 | dos-Santos | G06Q 10/025 701/117 |
| 8,386,177 | B2* | 2/2013 | Wu | 701/519 |
| 8,612,273 | B2* | 12/2013 | Johnson | 705/7.11 |
| 2001/0037174 | A1* | 11/2001 | Dickerson | 701/200 |
| 2002/0019760 | A1* | 2/2002 | Murakami et al. | 705/8 |
| 2004/0107110 | A1* | 6/2004 | Gottlieb et al. | 705/1 |
| 2006/0074545 | A1 | 4/2006 | Kim | |
| 2006/0276960 | A1* | 12/2006 | Adamczyk et al. | 701/201 |
| 2009/0292418 | A1 | 11/2009 | Kuykendal | |
| 2010/0197325 | A1* | 8/2010 | Dredge | 455/456.3 |
| 2011/0130950 | A1* | 6/2011 | Wexler | G01C 21/3492 701/532 |
| 2011/0184773 | A1* | 7/2011 | Forstall et al. | 705/7.25 |
| 2012/0023033 | A1* | 1/2012 | Tomasz | 705/345 |
| 2012/0253863 | A1* | 10/2012 | Forstall et al. | 705/7.12 |
| 2012/0277940 | A1* | 11/2012 | Kumar et al. | 701/20 |
| 2012/0290337 | A1* | 11/2012 | Helmy et al. | 705/5 |
| 2014/0050122 | A1* | 2/2014 | Pro et al. | 370/260 |
| 2014/0114565 | A1* | 4/2014 | Aziz et al. | 701/425 |
| 2014/0244326 | A1* | 8/2014 | Modica et al. | 705/7.13 |
| 2014/0343974 | A1* | 11/2014 | Graells et al. | 705/5 |

FOREIGN PATENT DOCUMENTS

| | | |
|---|---|---|
| FR | 2 899 005 A1 | 9/2007 |
| WO | WO 02/41226 A1 | 5/2002 |

OTHER PUBLICATIONS

European Search Report for Application No. EP 14 17 9424 dated Feb. 26, 2015.
Office Action for European Application No. 14179424.8 dated May 29, 2018, 9 pages.

* cited by examiner

METHOD AND APPARATUS FOR ASSIGNING VEHICLES TO TRIPS

TECHNOLOGICAL FIELD

Embodiments of the present invention relate generally to a method, apparatus, and computer program product for assigning a given transit vehicle whose location trace is available to a single candidate trip among a set of all trips.

BACKGROUND

Often, in real time transit tracking environments, transit vehicles, such as buses, may report at least their locations. However, buses often don't report the current trip that they are running on. Since the trip is not reported, one cannot detect if the bus is running late, on time, or ahead of schedule. In cases where buses are being tracked in real time and their trips or runs are not reported, a technique is needed to match buses to trips. Thus, one can then determine if buses are running late, on time, or ahead of time on their current trip. Once this is determined, advance transit features such as personalized real time transit routing and alerting may be possible in the transit system.

BRIEF SUMMARY

A method, apparatus and computer program product are therefore provided according to an example embodiment of the present invention matching transit vehicles (e.g., buses) to trips given the transit vehicle's real time locations and a set of spatial and temporal properties of the set of all trips. Some embodiments may enable several sophisticated features such as real time routing and service alerting to be provided.

In some embodiments, a method may be provided, the method comprising receiving probe data, the probe data comprising at least one of identity information, location information, or time information corresponding to a transit vehicle, causing, using a processor, placement of the probe data into a queue, wherein a placement in the queue is dependent on how much of the trip the transit vehicle has completed as indicated by the probe data, and causing assignment of the transit vehicle to a single candidate trip from among a set of candidate trips comprising a scheduled arrival time at a next closest stop closest to a calculated arrival time.

In some embodiments, the method may further comprise determining the next closest stop based on the probe data, calculating the arrival time of the transit vehicle at the next closest stop, wherein each candidate trip comprises a plurality of stops, each stop having a scheduled arrival time, and determining which single candidate trip from one or more unmatched scheduled trips comprises a scheduled arrival time for the next closest stop nearest in time to the calculated arrival time. In some embodiments, the method may further comprise causing removal of the probe data from the queue once the transit vehicle is assigned to the single candidate trip, and causing storage of information indicating a match of the transit vehicle and the single candidate trip match in memory.

In some embodiments, the transit vehicle assigned first was first priority in the queue, and the method may further comprise causing removal of the probe data from the queue once the transit vehicle is assigned to the single candidate trip, and causing assignment of a transit vehicle being of a second priority in the queue, to a second single candidate trip from among a set of candidate trips comprising a scheduled arrival time at a next closest stop closest to a calculated arrival time. In some embodiments, the method may further comprise causing assignment of a new transit vehicle to a next scheduled trip in an instance in which the queue is empty and the new transit vehicle is identified.

In some embodiments, the method may further comprise causing monitoring, for a predetermined period of time, of one or more transit vehicles for a change in state, wherein the states of the transit vehicles are one of active at start, new, change in direction, change in route, and silent. In some embodiments, the method may further comprise identifying a change in state of at least one transit vehicle, and causing a purging of one or more assignments from memory.

In some embodiments, an apparatus may be provided, the apparatus comprising at least one processor and at least one memory including computer program code, the at least one memory and the computer program code configured to, with the processor, cause the apparatus to at least receive probe data, the probe data comprising at least one of identity information, location information, or time information corresponding to a transit vehicle, cause placement of the probe data into a queue, wherein a placement in the queue is dependent on how much of the trip the transit vehicle has completed as indicated by the probe data, and cause assignment of the transit vehicle to a single candidate trip from among a set of candidate trips comprising a scheduled arrival time at a next closest stop closest to a calculated arrival time.

In some embodiments, the at least one memory and the computer program code are further configured to, with the processor, cause the apparatus to determine the next closest stop based on the probe data, calculate the arrival time of the transit vehicle at the next closest stop, wherein each candidate trip comprises a plurality of stops, each stop having a scheduled arrival time, and determine which single candidate trip from one or more unmatched scheduled trips comprises a scheduled arrival time for the next closest stop nearest in time to the calculated arrival time. In some embodiments, the at least one memory and the computer program code are further configured to, with the processor, cause the apparatus to cause removal of the probe data from the queue once the transit vehicle is assigned to the single candidate trip, and cause storage of information indicating a match of the transit vehicle and the single candidate trip match in memory.

In some embodiments, the transit vehicle assigned first was first priority in the queue, and the at least one memory and the computer program code are further configured to, with the processor, cause the apparatus to cause removal of the probe data from the queue once the transit vehicle is assigned to the single candidate trip, and cause assignment of a transit vehicle being of a second priority in the queue, to a second single candidate trip from among a set of candidate trips comprising a scheduled arrival time at a next closest stop closest to a calculated arrival time.

In some embodiments, the at least one memory and the computer program code are further configured to, with the processor, cause the apparatus to cause assignment of a new transit vehicle to a next scheduled trip in an instance in which the queue is empty and the new transit vehicle is identified. In some embodiments, the at least one memory and the computer program code are further configured to, with the processor, cause the apparatus to cause monitoring, for a predetermined period of time, of one or more transit vehicles for a change in state, wherein the states of the transit vehicles are one of active at start, new, change in direction, change in route, and silent. In some embodiments, the at least one memory and the computer program code are further configured to, with the processor, cause the apparatus to identify a change in state of at least one transit vehicle, and cause a purging of one or more assignments from memory.

In some embodiments, a computer program product is provided, comprising at least one non-transitory computer-readable storage medium having computer-executable program code portions stored therein, the computer-executable program code portions comprising program code instructions for receiving probe data, the probe data comprising at least one of identity information, location information, or time information corresponding to a transit vehicle, causing placement of the probe data into a queue, wherein a placement in the queue is dependent on how much of the trip the transit vehicle has completed as indicated by the probe data, and causing assignment of the transit vehicle to a single candidate trip from among a set of candidate trips comprising a scheduled arrival time at a next closest stop closest to a calculated arrival time.

In some embodiments, the computer-executable program code portions further comprise program code instructions for determining the next closest stop based on the probe data, calculating the arrival time of the transit vehicle at the next closest stop, wherein each candidate trip comprises a plurality of stops, each stop having a scheduled arrival time, and determining which single candidate trip from one or more unmatched scheduled trips comprises a scheduled arrival time for the next closest stop nearest in time to the calculated arrival time. In some embodiments, the computer-executable program code portions further comprise program code instructions for causing removal of the probe data from the queue once the transit vehicle is assigned to the single candidate trip, and causing storage of information indicating a match of the transit vehicle and the single candidate trip match in memory.

In some embodiments, the transit vehicle assigned first was first priority in the queue, wherein the computer-executable program code portions further comprise program code instructions for causing removal of the probe data from the queue once the transit vehicle is assigned to the single candidate trip, and causing assignment of a transit vehicle being of a second priority in the queue, to a second single candidate trip from among a set of candidate trips comprising a scheduled arrival time at a next closest stop closest to a calculated arrival time. In some embodiments, the computer-executable program code portions further comprise program code instructions for causing assignment of a new transit vehicle to a next scheduled trip in an instance in which the queue is empty and the new transit vehicle is identified.

In some embodiments, the computer-executable program code portions further comprise program code instructions for causing monitoring, for a predetermined period of time, of one or more transit vehicles for a change in state, wherein the states of the transit vehicles are one of active at start, new, change in direction, change in route, and silent. In some embodiments, the computer-executable program code portions further comprise program code instructions for identifying a change in state of at least one transit vehicle, and causing a purging of one or more assignments from memory.

BRIEF DESCRIPTION OF THE DRAWINGS

Figure 1:
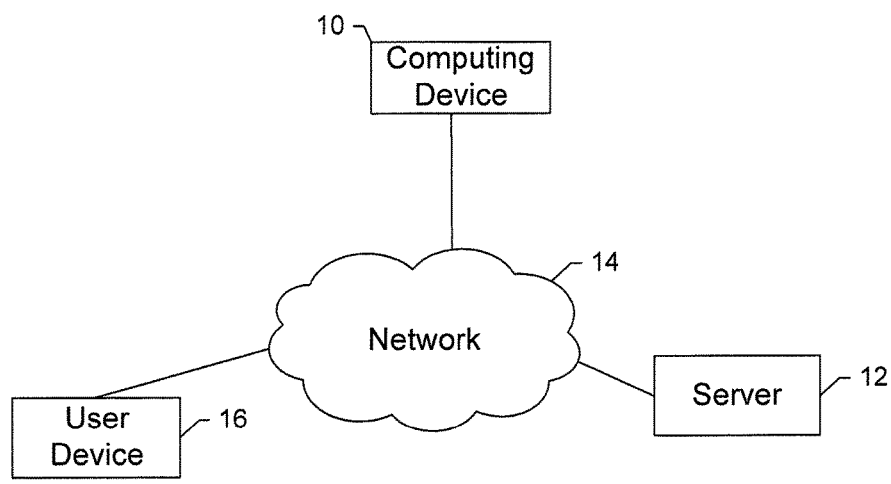
Figure 2:
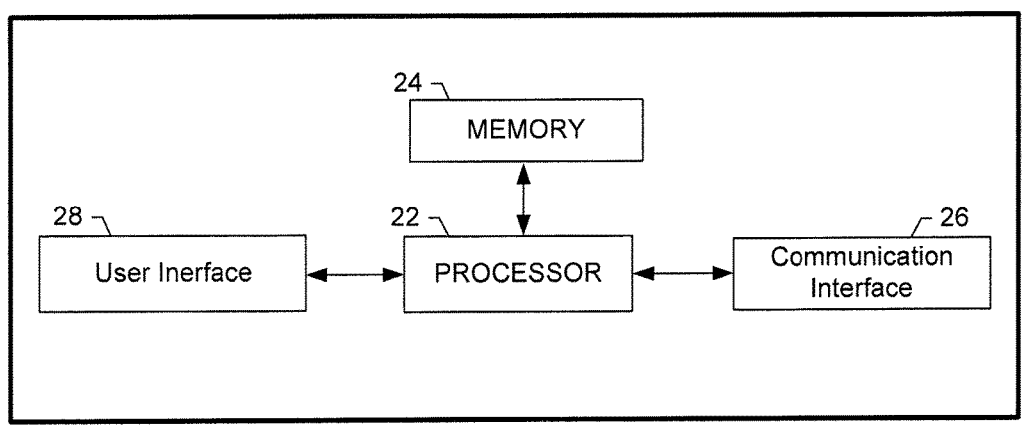
Figure 3:
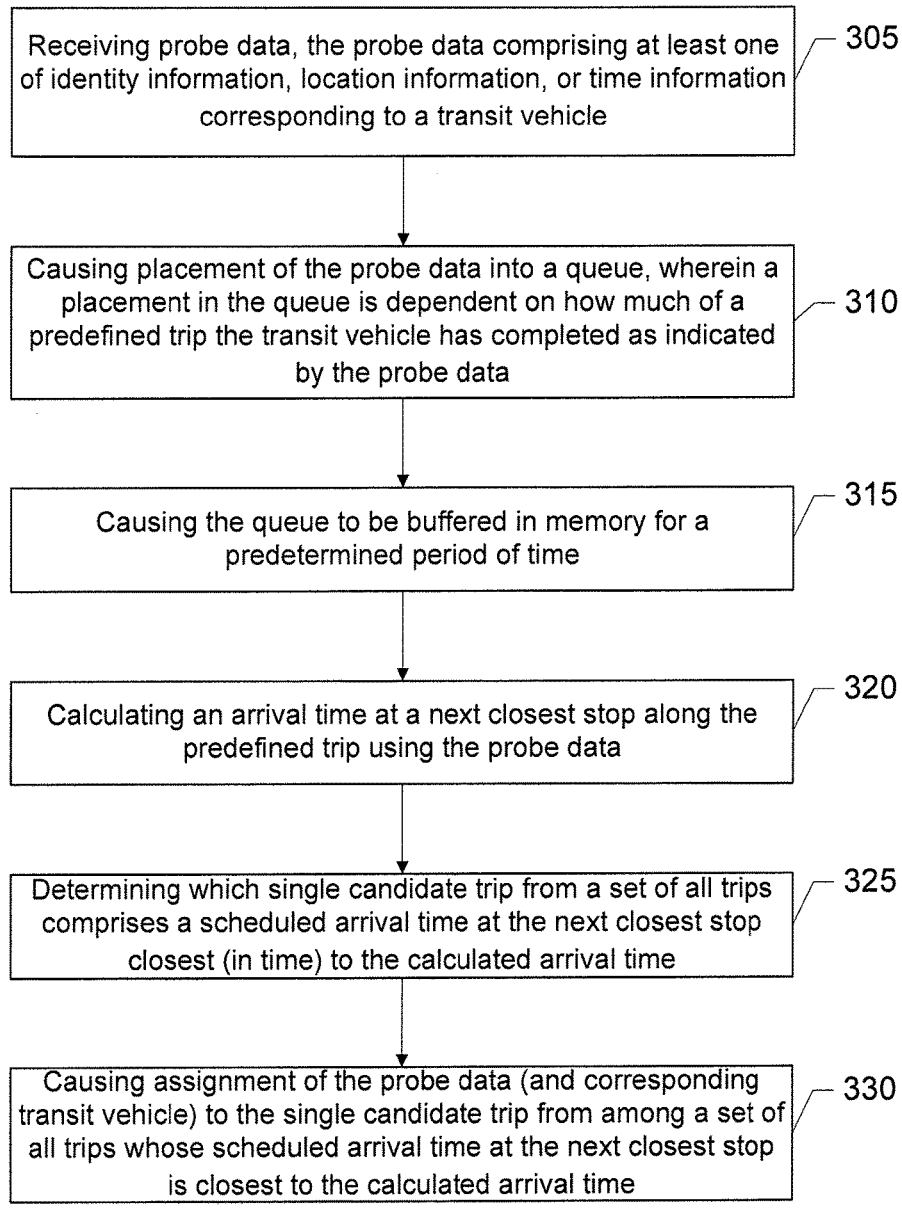
Figure 4:
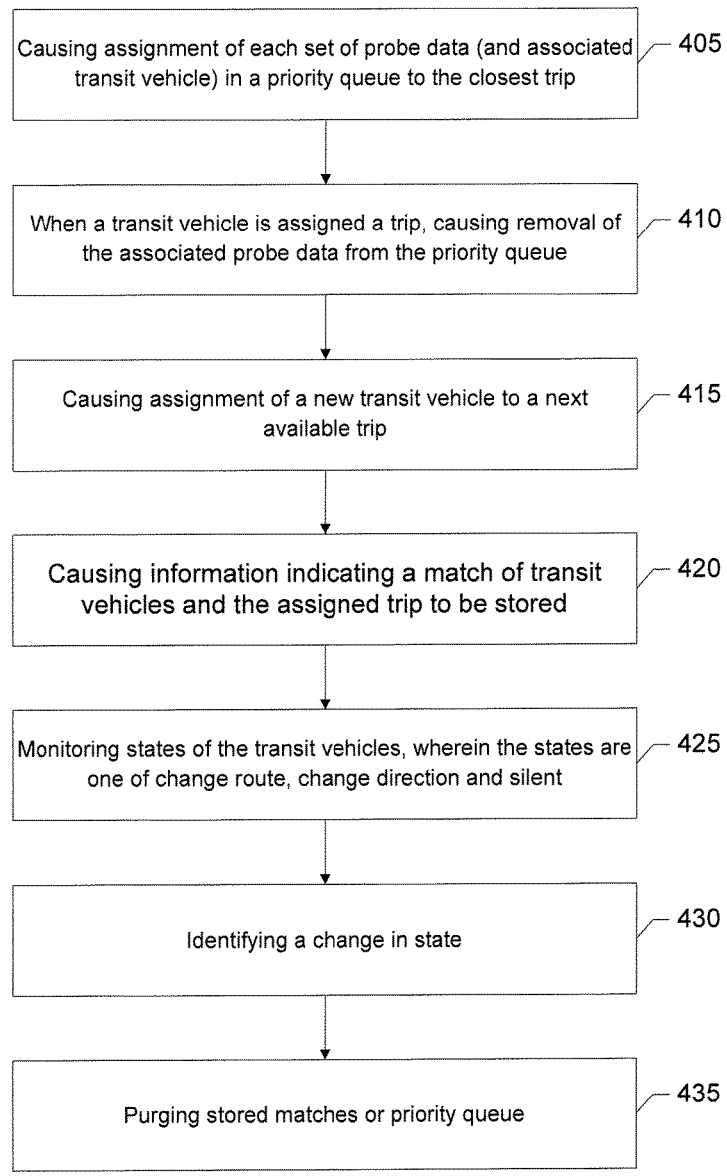
Figure 5:
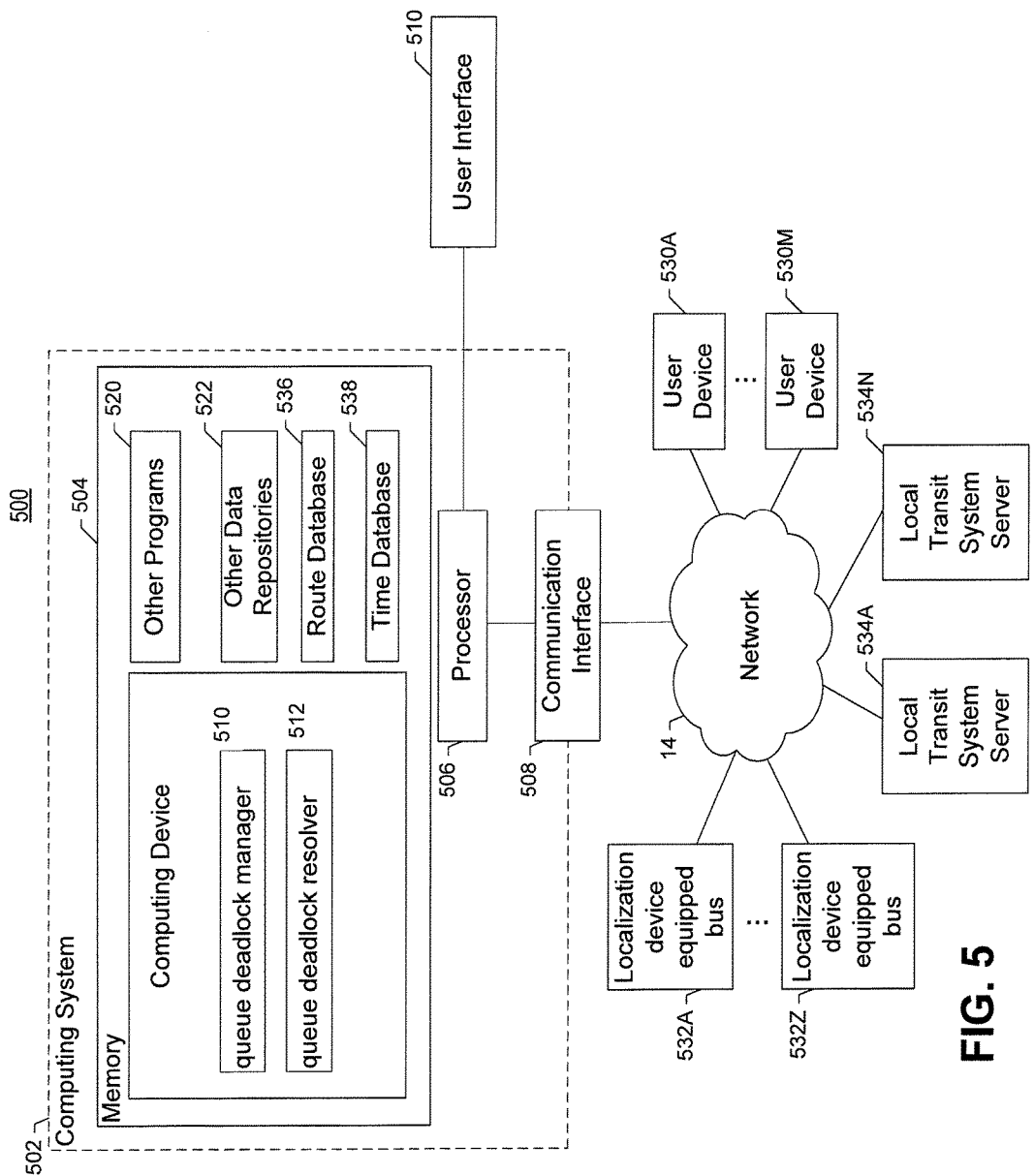

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is an example flowchart illustrating a method of operating an example apparatus in accordance with an embodiment of the present invention;

FIG. 4 is an example flowchart illustrating a method of operating an example apparatus in accordance with an embodiment of the present invention; and FIG. 5 is a block diagram of an apparatus that may be specifically configured in accordance with an example embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

In general, some embodiments presented herein are directed to assigning transit vehicles to a run or a trip. A trip may be a path from an origin to a destination through the transportation network. In addition to these two defining characteristics, there are other types of constraints that can be placed on a trip such as arrival time of the buses at facilities such as bus stops. Some embodiments presented herein are directed to assigning a given bus whose real time location trace is available to a single candidate trip among the set of all trips. Some embodiments presented here are directed to matching transit vehicles (e.g., buses) to trips given the bus's real time locations and a set of spatial and temporal properties of the set of all trips. Some embodiments enable one or more sophisticated features such as real time routing and service alerting to be provided by third party transit service providers, thus removing having to piggyback on municipals for service alerting capabilities.

In one example process for matching transit vehicles to predefined trips in a real time transit tracking environment, at system startup, all the active transit vehicles (e.g., buses) are placed in a priority queue. The priority criterion for heading the queue is distance along a route. Thus, buses that are further along the route are at the head of the queue. Each route direction may maintain a priority queue. Thus, if the route has two directions north and south bound, then only two priority queues are needed for the route. All active buses probes are archived in the queue until a time t has elapsed. After time t has elapsed, the buses are assigned to the closest trip using an extrapolation strategy. The order for trip assignment may be based on the order of probes in the priority queue.

When all active buses in their route direction are matched using the extrapolated proximity scheme, then any other incoming buses in the candidate route direction is called a new bus. New buses may be simply matched to the next available unmatched trip. After matching, buses and their matched trips may be stored in a memory storage facility and monitored for change of bus states. Bus states may include a change of route, change of direction, or silent state. When these states are reached, a deadlock resolver, such as may be embodied by the computing device 10, such as the processor, may prune buses from the priority queues.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet or a local area network. However, the computing device and the server may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device. The user device 14 may be embodied by a computing device, and in one embodiment, may be comprised of a plurality of computing devices.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

FIGS. 3 and 4 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3 and 4, when executed, convert a computer or processing circuitry into a particular machine configured to perform an example embodiment of the present invention. Accordingly, the operations of FIGS. 3 and 4 define an algorithm for configuring a computer or processing to perform an example embodiment. In some cases, a general purpose computer may be provided with an instance of the processor which performs the algorithms of FIGS. 3 and 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 3 is an example flowchart illustrating a method of operating an example computing system to assign transit vehicles to trips, performed in accordance with an embodiment of the present invention. In some embodiments, a predefined trip is the route and is traveled a plurality of times by a number of transit vehicles throughout a particular time period. The predefined trip may comprise a plurality of stops. The predefined trip may also have a set of candidate trips, each candidate trip comprising the plurality of stops or some subset of the plurality of stops, each stop having a scheduled arrival time.

As shown in block 302 of FIG. 3, the apparatus 20 embodied by the computing device 10 may therefore be configured to receive probe data. The apparatus embodied by the computing device therefore may include means, such as the processor 22, the communication interface 26 or the like, for receiving probe data. In some embodiments, probe data may comprise at least one of identity information, location information, or time information. In some embodiments, each of one or more probes (e.g., a set of probe data) may correspond to a transit vehicle, identifying the transit vehicle, the location and/or a corresponding time the identified transit vehicle was at the location. A specific example in the context of an embodiment of the present invention may be receiving one or more GPS traces obtained from GPS devices. The GPS devices may be part of or located on the transit vehicle. In some embodiments, drivers may carry a GPS equipped device configured to report transit vehicle identity, location and/or time to a computing system. In some embodiments, location data is received as latitude and longitude.

As shown in block 310 of FIG. 3, the apparatus 20 embodied by the computing device 10 may be configured to cause placement of the probe data into a queue. The apparatus embodied by the computing device may therefore include means, such as the processor 22 or the like, for causing placement of the probe data into a queue. In some embodiments, a placement in the queue may be dependent on how much of a predefined trip the transit vehicle has completed as indicated by the probe data. For example, in the case of a bus traveling along a bus route, a bus who has completed more of the route (e.g., as measured in stops, distance, time, percentage or the like) may be put into a higher placement in the queue.

In some embodiments, one or more queues may be generated and/or used for each route. In one embodiment, the number of queues used for a particular route depends on the number of different directions or route legs on the route. For example, where a route leg has two directions (e.g., north bound and south bound or east bound and west bound), each direction may correspond to an inbound or outbound priority queue. In some embodiments, the order for trip assignment may be based on the order of transit vehicles in the queue.

As shown in block 315 of FIG. 3, the apparatus 20 embodied by the computing device 10 may be configured to cause the queue to be buffered in memory for a predetermined period of time. The apparatus embodied by the computing device may include means, such as the processor 22 or the like, for causing the queue to be buffered in memory for a predetermined period of time. As shown in block 320 of FIG. 3, the apparatus 20 embodied by the computing device 10 may be configured to calculate an arrival time at a next closest stop along a predefined trip using the probe data. The apparatus embodied by the computing device may include means, such as the processor 22, the communication interface 26 or the like, for calculating an arrival time at a next closest stop along the predefined trip using the probe data.

In one example embodiment, all probes may be buffered in the queue until a time t has elapsed. After time t, all the buses in their priority queue may then be assigned to the closest run. The closest run may be computed using the buses current location, where an extrapolation may be done to determine an arrival time at the closest upcoming bus stop. Given this computed arrival time, the unassigned trip with a schedule closest to this arrival time is selected as the candidate trip As such, as shown in block 325 of FIG. 3, the apparatus 20 embodied by the computing device 10 may be configured to determine which single candidate trip from a set of all trips comprises a scheduled arrival time at the next closest stop closest (in time) to the calculated arrival time. The apparatus embodied by the computing device may therefore include means, such as the processor 22 or the like, for determining which single candidate trip from a set of all trips comprises a scheduled arrival time at the next closest stop closest (in time) to the calculated arrival time.

As shown in block 330 of FIG. 3, the apparatus 20 embodied by the computing device 10 may be configured to cause assignment of the probe data (and corresponding transit vehicle) to the single candidate trip from among a set of all trips whose scheduled arrival time at the next closest stop is closest to the calculated arrival time. The apparatus embodied by the computing device may therefore include means, such as the processor 22 or the like, for causing assignment of the probe data (and corresponding transit vehicle) to the single candidate trip from among a set of all trips whose scheduled arrival time at the next closest stop is closest to the calculated arrival time.

In some embodiments, transit vehicles and/or their probe data may be monitored for changes in state, which may then effect the assignment of each of one or more transit vehicles to trips. FIG. 4 is an example flowchart illustrating a method of operating an example computing system performed in accordance with an embodiment of the present invention.

In some embodiments, transit vehicles that are active at startup are assigned to trips based on proximity of trip schedules and extrapolated schedule and once a transit vehicle is assigned to a trip, it may then be removed from the priority queue. The transit vehicle identification and trip identification of the match may then be stored in a storage entity. As such, shown in block 405 of FIG. 4, the apparatus 20 embodied by the computing device 10 may be configured to cause assignment of each of transit vehicle in a priority queue to the closest trip. The apparatus embodied by the computing device may therefore include means, such as the processor 22, the communication interface 26 or the like, for causing assignment of each transit vehicle in a priority queue to the closest trip.

As shown in block 410 of FIG. 4, the apparatus 20 embodied by the computing device 10 may be configured to, once a transit vehicle is assigned a trip, cause removal of the probe data related to the transit vehicle from the priority queue. The apparatus embodied by the computing device may therefore include means, such as the processor 22 or the like, for, once a transit vehicle is assigned a trip, causing removal of the probe data associated with the transit vehicle from the priority queue. In some embodiments, the transit vehicle first assigned may be associated with the probe data placed first in the queue. Once the transit vehicle is assigned to a trip and the associated probe data is removed, the apparatus may be configured to perform the assignment process on a transit vehicle now placed first in the queue (e.g., the transit vehicle that may have been previously second in the initial queue).

In some embodiments, transit vehicles that were not active at startup may be referred to as new transit vehicles. In an example embodiment, new transit vehicles may only be assigned to a trip when the priority queue in its direction is empty or has zero transit vehicles. New transit vehicles may be assigned the next unassigned trip and may then be removed from the priority queue (e.g., dequeued). The transit vehicles identification and trip identification of the match may be stored in a storage entity. In some embodiments, new transit vehicles that are not active at startup may be assigned the next available trip Therefore, as shown in block 415 of FIG. 4, the apparatus 20 embodied by the computing device 10 may be configured to cause assignment of a new transit vehicle to a next available trip. The apparatus embodied by the computing device may therefore include means, such as the processor 22, the memory 24, the communication interface 26 or the like, for causing assignment of a new transit vehicle to a next available trip.

As shown in block 420 of FIG. 4, the apparatus 20 embodied by the computing device 10 may be configured to cause information indicating a match of the transit vehicle and the single candidate trip match in memory (e.g., transit vehicles and their matched trip to be stored in memory). The apparatus embodied by the computing device may therefore include means, such as the processor 22, the communication interface 26 or the like, for causing information indicating a match of the transit vehicle and the single candidate trip match in memory.

In some embodiments, once transit vehicles are assigned to trips, the transit vehicles are further monitored using for example, a deterministic finite state machine that tracks the transit vehicles' states. After, trip assignment/matching, three distinct states may be possible. The three states are for example, (1) change of route (2) change of direction and (3) go silent. For the change of route transit vehicle state, a transit vehicle that was matched to a trip on a candidate route now starts to traverse a new route. For example, a transit vehicle that was on route 12 suddenly starts operating on route 19. Such behavior may be due to the transit company's business where a particular route may have too few buses. For the change of direction transit vehicle state, a transit vehicle that was matched to a trip on a candidate route may now start to traverse a new direction along the same route. For example, a bus that was on route 12 northbound suddenly starts operating on route 12 south bound. This can be due to the transit company's business where each direction (e.g., north bound and south bound) of the route is traversed alternately. For the go silent transit vehicle state, a transit vehicle that was matched to a trip on a candidate route now stops submitting GPS reports. This can be due to mechanical failures with the GPS system, the transit vehicle going under a bridge or otherwise being unable to determine its location, or the transit vehicle engine being turned off.

When the silent state is determined, the memory archive may be updated and the candidate match pruned from the archive. When a transit vehicle is matched and assigned a trip and any of the three transit vehicle states are reached, a transit vehicle queue deadlock manager such as may be embodied by a computing device 10, such as the processor 22, may be activated. The transit vehicle queue deadlock resolver may then purge the priority queues when transit vehicles with assigned trips changes state. When a new transit vehicle enters the system, the transit vehicle queue deadlock manager may also be activated. The queue deadlock resolver may purge the priority queues given the new bus identification. In other words, any probe in the priority queue with the same transit vehicle identification as the new transit vehicle may be suppressed from the priority queue. Once the priority queues are empty, only new transit vehicles may be allowed in the system. These new transit vehicles may continue to activate the queue deadlock resolver and then get matched to the next unassigned trip.

As such, as shown in block 425 of FIG. 4, the apparatus 20 embodied by the computing device 10 may be configured to monitor states of the transit vehicles. The apparatus embodied by the computing device may therefore include means, such as the processor 22, the communication interface 26 or the like, for monitoring states of the transit vehicles. In some embodiments, the states that may be monitored are one of active at start, new, change of route, change of direction and go silent.

As shown in block 430 of FIG. 4, the apparatus 20 embodied by the computing device 10 may be configured to identify a change in state. The apparatus embodied by the computing device may therefore include means, such as the processor 22, the communication interface 26 or the like, for identifying a change in state.

In some embodiments, the apparatus may be configured for continuous deadlock detecting based on transit vehicles changing state while being inside the queue. For example, a transit vehicle may be at a particular position in the queue, for example, first in the queue, and waiting to be assigned a trip. But the transit vehicle may have gone silent before trip assignment. Since the vehicle went silent, other vehicles waiting in the queue cannot wait indefinitely. Thus deadlock detection removes a transit vehicle from the queue if the transit vehicle went silent. In other words, in an instance in which a queued transit vehicle is identified to be in a silent state, the apparatus may be configured to remove the transit vehicle from the queue. In some embodiments, queued transit vehicles identified to be in silent state are skipped or pushed down the queue until a change in state from the silent state.

As shown in block 435 of FIG. 4, the apparatus 20 embodied by the computing device 10 may be configured to purge at least one of the queue related to a trip or the stored matches related to trip. The apparatus embodied by the computing device may therefore include means, such as the processor 22, the communication interface 26 or the like, for purging at least one of the queues related to a trip or the stored matches related to trip.

In some embodiments, once the stored matches are purged, the process may begin again. For example, when a change in state is detected during monitoring, the matches of a particular transit vehicle to a particular trip are purged. Then apparatus may then receive probe data from each of one or more transit vehicles, place the transit vehicles into trip related priority queues based on a portion completed, calculate arrival times at next closest stops, and determine which candidate trips match the calculated arrival times. The transit vehicles are then matched to the single candidate trips from among the set of all trips whose scheduled arrival time at the next closest stop is closest to the calculated arrival time.

FIG. 5 is an example block diagram of an example computing system 500 for practicing embodiments of an automated transit tracking system 502. In particular, FIG. 5 shows a system 500 that may be utilized to implement an automated transit tracking system 502 for matching transit vehicles to trips in a real time transit tracking environment. Note that one or more general purpose or special purpose computing systems/devices may be used to implement the automated transit tracking system 502. In addition, the system 502 may comprise one or more distinct computing systems/devices and may span distributed locations. Furthermore, each block shown may represent one or more such blocks as appropriate to a specific embodiment or may be combined with other blocks. For example, in some embodiments the system 502 may contain a queue deadlock manager 510, a queue deadlock resolver 512 or a combination thereof. In other example embodiments, the queue deadlock manager 510 and/or the queue deadlock resolver 512 may be configured to operate on separate systems (e.g. a mobile terminal and a remote server, multiple remote servers and/or the like). For example, the queue deadlock manager 510 or the queue deadlock resolver 512 may be configured to operate on a mobile terminal. Also, automated transit tracking system 502 may be implemented in software, hardware, firmware, or in some combination to achieve the capabilities described herein.

While the system 502 may be employed, for example, by a mobile terminal 10, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In the embodiment shown, system 502 comprises a computer memory ("memory") 504, one or more processors 506 (e.g. processing circuitry) and a communications interface 508. The computing device(s) are shown residing in memory 504. In other embodiments, some portion of the contents, some or all of the components of the system 502 may be stored on and/or transmitted over other computer-readable media. The components of the system 502 preferably execute on one or more processors 506 and are configured to receive probe data and assign transit vehicles to trips. Other code or programs 520 (e.g., an administrative interface, a Web server, and the like) and potentially other data repositories, such as data repository 522, also reside in the memory 504, and preferably execute on processor 506. Of note, one or more of the components in FIG. 5 may not be present in any specific implementation.

In a typical embodiment, as described above, the system 502 may include a queue deadlock manager 510, a queue deadlock resolver 512 or a combination thereof. Although shown in FIG. 5 to reside in memory so as to executed by, for example, in order to cause their respective functions to be performed, the queue deadlock manager and/or the queue deadlock resolver may be implemented in hardware and, as such, the processor of one embodiment may embody the queue deadlock manager and/or the queue deadlock resolver. The queue deadlock manager 510, the queue deadlock resolver 512 or a combination thereof may perform functions such as those outlined in FIG. 1. The system 502 interacts via the network 14 via a communications interface 508 with (1) mobile terminals 530, (2) localization device equipped transit vehicles (e.g., bus(es)) 532A-Z and/or (3) local transit system servers 534A-N. The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 508 may be capable of operating with one or more air interface standards, communication protocols, modulation types, access types, and/or the like. More particularly, the system 502, the communications interface 508 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the system 502 may be implemented using standard programming techniques. For example, the system 502 may be implemented as a "native" executable running on the processor 506, along with one or more static or dynamic libraries. In other embodiments, the system 502 may be implemented as instructions processed by a virtual machine that executes as one of the other programs 520. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the system 502, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the automated transit route derivation system 302 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page or "app" may be performed by a web browser on a user's mobile communications device 10. An HTML5 or JavaScript™ "app" allows web page script to contact a server 12, such as those shown in FIG. 1, for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for assigning a transit vehicle whose location trace is available to a single candidate trip among a set of candidate trips for a route, the method comprising:
   receiving probe data, the probe data comprising at least one of identity information, location information, or time information corresponding to a transit vehicle;
   determining a route corresponding to the probe data of the transit vehicle;
   causing, using a processor, placement of the probe data into an entry in a priority queue associated with the route in accordance with a priority criterion, each entry in the priority queue representative of a single transit vehicle traveling along the route, the priority queue being one queue of at least two queues and indicative of a direction, wherein a placement of each entry in the priority queue is dependent on how much of the trip the associated transit vehicle has completed as indicated by the probe data for each entry, wherein the priority criterion for the placement in the priority queue includes distance along the route, such that entry data corresponding to probe data indicative of transit vehicles that are further along the route are prioritized within the priority queue;
   causing assignment of the transit vehicle to a single candidate trip from among a set of candidate trips for the route comprising a scheduled arrival time at a next closest stop closest to a calculated arrival time;
   causing removal of the entry associated with the transit vehicle from the priority queue associated with the route in response to the transit vehicle being assigned to the single candidate trip;
   causing storage of information indicating a match between the transit vehicle and the single candidate trip from among the set of candidate trips;
   causing monitoring, for a predetermined period of time, of the probe data of the transit vehicle for a change in state, wherein the states of the transit vehicle are one of active at start, new, change in direction, change in route, and silent; and
   providing for personalized, real-time transit routing and alerting based on the matched transit vehicle and the single candidate trip.

2. The method of claim 1, further comprising:
   determining the next closest stop based on the probe data;
   calculating the arrival time of the transit vehicle at the next closest stop,
   wherein each candidate trip comprises a plurality of stops, each stop having a scheduled arrival time; and determining which single candidate trip from one or more unmatched scheduled trips comprises a scheduled arrival time for the next closest stop nearest in time to the calculated arrival time.

3. The method of claim 1, wherein the transit vehicle is a first transit vehicle, the method further comprising:
receiving probe data corresponding to a second transit vehicle;
causing assignment of the second transit vehicle to a second priority in the priority queue lower than the first transit vehicle in response to the second transit vehicle having completed less of a trip than the first transit vehicle, and
causing assignment of the second transit vehicle to a second single candidate trip from among a set of candidate trips comprising a scheduled arrival time at a next closest stop closest to a calculated arrival time.

4. The method of claim 1, further comprising:
causing assignment of a new transit vehicle to a next scheduled trip in an instance in which the priority queue is empty and the new transit vehicle is identified.

5. The method of claim 1, further comprising:
identifying a change in state of at least one transit vehicle; and
causing a purging of one or more assignments from a memory.

6. An apparatus for assigning a transit vehicle whose location trace is available to a single candidate trip among a set of candidate trips for a route, the apparatus comprising at least one processor and at least one memory including computer program code, the at least one memory and the computer program code configured to, with the processor, cause the apparatus to at least:
receive probe data, the probe data comprising at least one of identity information, location information, or time information corresponding to a transit vehicle;
determine a route corresponding to the probe data of the transit vehicle;
cause placement of the probe data into an entry in a priority queue associated with the route in accordance with a priority criterion, each entry in the priority queue representative of a single transit vehicle traveling along the route, the priority queue being one queue of at least two queues and indicative of a direction, wherein a placement of each entry in the priority queue is dependent on how much of the trip the associated transit vehicle has completed as indicated by the probe data for each entry, wherein the priority criterion for the placement in the queue includes distance along the route, such that entry data corresponding to probe data indicative of transit vehicles that are further along the route are prioritized within the priority queue;
cause assignment of the transit vehicle to a single candidate trip from among a set of candidate trips for the route comprising a scheduled arrival time at a next closest stop closest to a calculated arrival time;
cause removal of the entry associated with the transit vehicle from the priority queue associated with the route in response to the transit vehicle being assigned to the single candidate trip;
cause storage of information indicating a match between the transit vehicle and the single candidate trip from among the set of candidate trips; and
cause monitoring, for a predetermined period of time, of the probe data of the transit vehicle for a change in state, wherein the states of the transit vehicle are one of active at start, new, change in direction, change in route, and silent.

7. The apparatus according to claim 6, wherein the at least one memory and the computer program code are further configured to, with the processor, cause the apparatus to:
determine the next closest stop based on the probe data;
calculate the arrival time of the transit vehicle at the next closest stop, wherein each candidate trip comprises a plurality of stops, each stop having a scheduled arrival time; and
determine which single candidate trip from one or more unmatched scheduled trips comprises a scheduled arrival time for the next closest stop nearest in time to the calculated arrival time.

8. The apparatus according to claim 6, wherein the transit vehicle is a first transit vehicle, and wherein the at least one memory and the computer program code are further configured to, with the processor, cause the apparatus to:
receive probe data corresponding to a second transit vehicle;
cause assignment of the second transit vehicle to a second priority in the priority queue lower than the first transit vehicle in response to the second transit vehicle having completed less of a trip than the first transit vehicle, and
cause assignment of the second transit vehicle to a second single candidate trip from among a set of candidate trips comprising a scheduled arrival time at a next closest stop closest to a calculated arrival time.

9. The apparatus according to claim 6, wherein the at least one memory and the computer program code are further configured to, with the processor, cause the apparatus to:
cause assignment of a new transit vehicle to a next scheduled trip in an instance in which the priority queue is empty and the new transit vehicle is identified.

10. The apparatus according to claim 6, wherein the at least one memory and the computer program code are further configured to, with the processor, cause the apparatus to:
identify a change in state of at least one transit vehicle; and
cause a purging of one or more assignments from memory.

11. A computer program product for assigning a transit vehicle whose location trace is available to a single candidate trip among a set of candidate trips for a route, the computer program product comprising at least one non-transitory computer-readable storage medium having computer-executable program code portions stored therein, the computer-executable program code portions comprising program code instructions for:
receiving probe data, the probe data comprising at least one of identity information, location information, or time information corresponding to a transit vehicle;
determining a route corresponding to the probe data of the transit vehicle;
causing placement of the probe data into an entry in a priority queue associated with the route in accordance with a priority criterion, each entry in the priority queue representative of a single transit vehicle traveling along the route, the priority queue being one queue of at least two queues and indicative of a direction, wherein a placement of each entry in the queue is dependent on how much of the trip the associated transit vehicle has completed as indicated by the probe data for each entry, wherein the priority criterion for the placement in the queue includes distance along the route, such that entry data corresponding to probe data indicative of transit vehicles that are further along the route are prioritized within the priority queue;

causing assignment of the transit vehicle to a single candidate trip from among a set of candidate trips for the route comprising a scheduled arrival time at a next closest stop closest to a calculated arrival time;

causing removal of the entry associated with the transit vehicle from the priority queue associated with the route in response to the transit vehicle being assigned to the single candidate trip;

causing storage of information indicating a match between the transit vehicle and the single candidate trip from among the set of candidate trips; and causing monitoring, for a predetermined period of time, of the probe data of the transit vehicle for a change in state, wherein the states of the transit vehicle are one of active at start, new, change in direction, change in route, and silent.

12. The computer program product according to claim 11, wherein the computer-executable program code portions further comprise program code instructions for:

determining the next closest stop based on the probe data;

calculating the arrival time of the transit vehicle at the next closest stop, wherein each candidate trip comprises a plurality of stops, each stop having a scheduled arrival time; and determining which single candidate trip from one or more unmatched scheduled trips comprises a scheduled arrival time for the next closest stop nearest in time to the calculated arrival time.

13. The computer program product according to claim 11, wherein the transit vehicle is a first transit vehicle, wherein the computer-executable program code portions further comprise program code instructions for:

receiving probe data corresponding to a second transit vehicle;

causing assignment of the second transit vehicle to a second priority in the priority queue lower than the first transit vehicle in response to the second transit vehicle having completed less of a trip than the first transit vehicle, and causing assignment of the second transit vehicle to a second single candidate trip from among a set of candidate trips comprising a scheduled arrival time at a next closest stop closest to a calculated arrival time.

14. The computer program product according to claim 11, wherein the computer-executable program code portions further comprise program code instructions for:

causing assignment of a new transit vehicle to a next scheduled trip in an instance in which the priority queue is empty and the new transit vehicle is identified.

15. The computer program product according to claim 11, wherein the computer-executable program code portions further comprise program code instructions for:

identifying a change in state of at least one transit vehicle; and causing a purging of one or more assignments from the at least one memory.

\* \* \* \* \*